(No Model.)

G. McDONALD.
PUNCHING AND SHEARING MACHINE.

No. 343,917. Patented June 15, 1886.

WITNESSES:
Dugald McKillop.
Robert Kirk

INVENTOR:
Gilbert McDonald
By J. J. Zerbe
Attorney.

N. PETERS, Photo-Lithographer, Washington, D. C.

United States Patent Office.

GILBERT McDONALD, OF NEW HAMPTON, IOWA.

PUNCHING AND SHEARING MACHINE.

SPECIFICATION forming part of Letters Patent No. 343,917, dated June 15, 1886.

Application filed March 24, 1886. Serial No. 196,400. (No model.)

*To all whom it may concern:*

Be it known that I, GILBERT McDONALD, of New Hampton, in the county of Chickasaw and State of Iowa, have invented a new and useful Improvement in Punching and Shearing Machines, which improvement is fully set forth in the following specification and accompanying drawings, in which—

Figure 1:
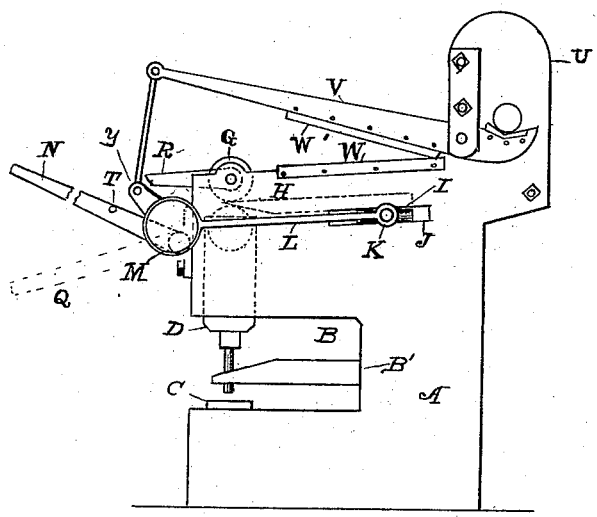
Figure 3:
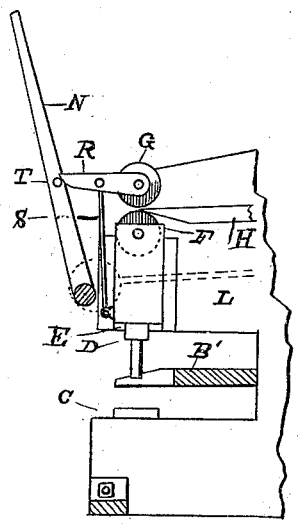
Figure 2:
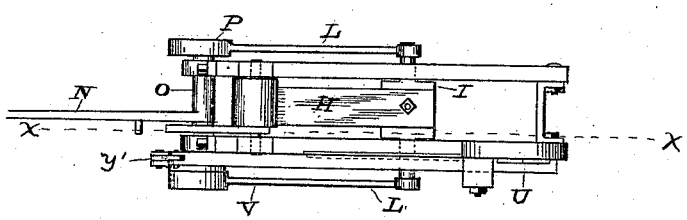

Figure 1 is a side view of my improved punching and shearing machine; Fig. 2, a plan view of the same, and Fig. 3 a vertical section through line X.

This invention relates to an improvement in punching and shearing machines, consisting of the horizontal shaft having an operating-lever attached thereto, and eccentrics so disposed as to act with an adjustable wedge operated between friction-rollers above the punch, so that an immense leverage can be brought to bear in operating the punch, and, in connection with the device, a lever and crank connection is had with a horizontal shaft at the forward part of the device operating a shear and lever at the upper part of the device, so as to be used in cutting bars and rods, and thus the device may be used at the same time both for punching and cutting, all of which will now be fully set forth in detail.

In the accompanying drawings, A represents the main frame, having forwardly the opening B, provided at its lower side with the perforated plate C. Above this opening, within the frame, I provide the plunger D, disposed within the ways E. The upper end of this plunger D is provided with a friction-roller, F, journaled therein, and immediately above, journaled within the frame, is a second independent friction-roller, G. Operating between these friction-rollers F and G is a horizontally-projecting wedge, H, secured to the cross-shaft I, operating within ways J, the outer end of the said shaft I being provided with spindles K, connecting with the forwardly-projecting pitman-rods L.

At the forward part of the frame A, above the opening B, I provide a transverse shaft, M, having centrally a forwardly-projecting lever, N, and laterally at the ends spindles O with eccentrics P secured rigidly thereto. The pitman-rods L are disposed on the spindles K outwardly from the sides of the frame A, and connected with the eccentrics P at the ends of the shaft M in such a way that when the lever N is in a vertical position above the shaft M, the shaft I, carrying the wedge H, will be disposed rearwardly within the ways J with the point of the wedge in contact with the friction-rollers F and G, and as the lever N is moved forward and downwardly, as shown by dotted lines Q, the wedge H will be moved forward between the said friction-rollers F and G, and thus force the plunger D downwardly toward the perforated plate C. At the side of the friction-roller G, I provide a forwardly-projecting arm, R, having a downwardly-projecting pitman, S, connecting with the plunger D, and at the side of the lever N is a lug, T, so disposed that when the said lever is raised this lug will come in contact with the arm R and raise the plunger D as the wedge H is withdrawn from between the rollers F and G.

At the upper part of the frame A, rearwardly, I provide an upwardly-projecting part, U, having a lever, V, hinged thereto, provided with shears W and W' for cutting bars and rods, and connected with the arm Y extending outwardly from one of the eccentrics P by means of the pitman Y', and operated in connection with the plunger D and by the same movement of the lever N.

A forwardly-projecting arm, B', is secured rearwardly within the opening B, so disposed as to embrace the punch at the lower end of the plunger, beneath which the metal to be punched is placed, so that when the plunger D is raised the plate will be held in position and permit the punch to be withdrawn from the opening.

As will be noticed, the operation of the device is very simple, and merely consists in placing the metal plates, as already shown, in the opening B, beneath the arm B', the lever N being vertically above the shaft M. The plunger D is then elevated. After the plate is in position the lever N is pulled forward and downwardly, causing the wedge H to be inserted between the friction-rollers F and G, which forces the plunger D and punch downwardly. A reverse motion of the lever N raises the plunger D and reverses the wedge H. When bars or rods are designed to be cut, the same movement of the lever is made, and it will be noticed that when the lever N and plunger D are raised so as to permit of the plate being inserted in the opening B, it also raises the forward part of the lever V, thus placing this lever in position to sever the said bars or rods.

Having described my invention, what I claim as new is—

1. The combination of the plunger D, having the friction-roller F, and the friction-roller G journaled above with the wedge H, the pitmen L, eccentrics P, shaft M, and lever N, substantially as herein set forth.

2. The combination of the shaft M, lever N, and crank Y with the shear V, upright U, and the pitman Y', substantially as herein set forth.

3. The combination of the plunger D, the perforated plate C, and the projecting arm B' with the arm R, pitman S, and lug T upon the lever N, substantially as herein set forth.

4. The combination of the shaft M, the lever N, the crank Y, and the pitman Y' with the shear-lever V, the eccentrics, pitmen, wedge, rollers, and plunger, whereby the plunger D and the shear may be operated simultaneously by a single movement of the lever N, substantially as set forth.

5. The combination of the frame A, having the opening B and arm B' and plate C therein, the friction-rollers F and G, and plunger D with the wedge H, pitmen L, eccentrics P, and lever N, substantially as herein set forth.

6. The combination of the frame A and the lever V, having shears W and W', with the pitman Y', crank Y, lever N, lug T, arm R, and the plunger D, substantially as herein set forth.

7. The combination of the frame A, plunger D, shaft M, lever N, eccentrics P, pitmen L, and wedge H with the pitman Y', lever V, and rollers F and G, substantially as and for the purpose herein set forth and described.

In testimony that I claim the foregoing I have hereunto set my hand, this 8th day of March, 1886, in the presence of witnesses.

GILBERT McDONALD.

Witnesses:
C. D. ZERBE,
DUGALD McKILLOP.